United States Patent [19]

Roberts

[11] Patent Number: 5,357,668

[45] Date of Patent: Oct. 25, 1994

[54] METHOD AND APPARATUS FOR POSITIONING A WORKPIECE AND TOOLING

[75] Inventor: Bradley M. Roberts, Williamsville, N.Y.

[73] Assignee: Gemcor Engineering Corp., Buffalo, N.Y.

[21] Appl. No.: 84,515

[22] Filed: Jun. 29, 1993

[51] Int. Cl.⁵ ............................................. B23Q 7/00
[52] U.S. Cl. ..................................... 29/559; 29/407;
29/468; 29/715; 227/4; 227/152; 227/154
[58] Field of Search .............. 29/407, 524.1, 525.2,
29/559, 468, 243.53, 715; 227/4, 6, 152, 154,
100, 106, 145

[56] References Cited

U.S. PATENT DOCUMENTS

| | | | |
|---|---|---|---|
| 3,534,896 | 10/1970 | Speller et al. | 227/51 |
| 3,557,442 | 1/1971 | Speller | 29/525.2 |
| 4,650,104 | 3/1987 | Seki | 227/154 X |
| 4,858,289 | 8/1989 | Speller, Sr. | 29/34 B |
| 4,864,702 | 9/1989 | Speller, Sr. et al. | 29/34 B |
| 4,864,713 | 9/1989 | Roberts et al. | 29/524.1 |
| 5,098,001 | 3/1992 | Smart et al. | 227/4 X |

Primary Examiner—Mark Rosenbaum
Assistant Examiner—S. Thomas Hughes
Attorney, Agent, or Firm—Hodgson, Russ, Andrews, Woods & Goodyear

[57] ABSTRACT

A method and apparatus for positioning the top surface of a workpiece in proper relationship with respect to tooling including a fully extended upper clamp bushing, or for positioning the fully extended upper clamp bushing in proper relationship with respect to the top surface of a workpiece, which establishes a desired workplane wherein the top surface of the workpiece is always disposed in a normal position with respect to the lowermost surface of the upper clamp bushing and just in contact with the lowermost surface even though the top surface was disposed either below or above the desired workplane at the commencement of the clamping operation. The method and apparatus is capable of moving the top surface of the workpiece or the tooling into a desired workplane and also of determining whether or not the top surface of the workpiece adjacent the area which is to be fastened lies within the desired workplane. The apparatus including a plurality of position sensors associated with the upper clamp bushing, which sensors are capable of sensing when the upper clamp bushing contacts the top surface of the workpiece or is contacted by it, the apparatus further including a control for moving the workpiece to the desired position in response to the position sensors.

23 Claims, 3 Drawing Sheets

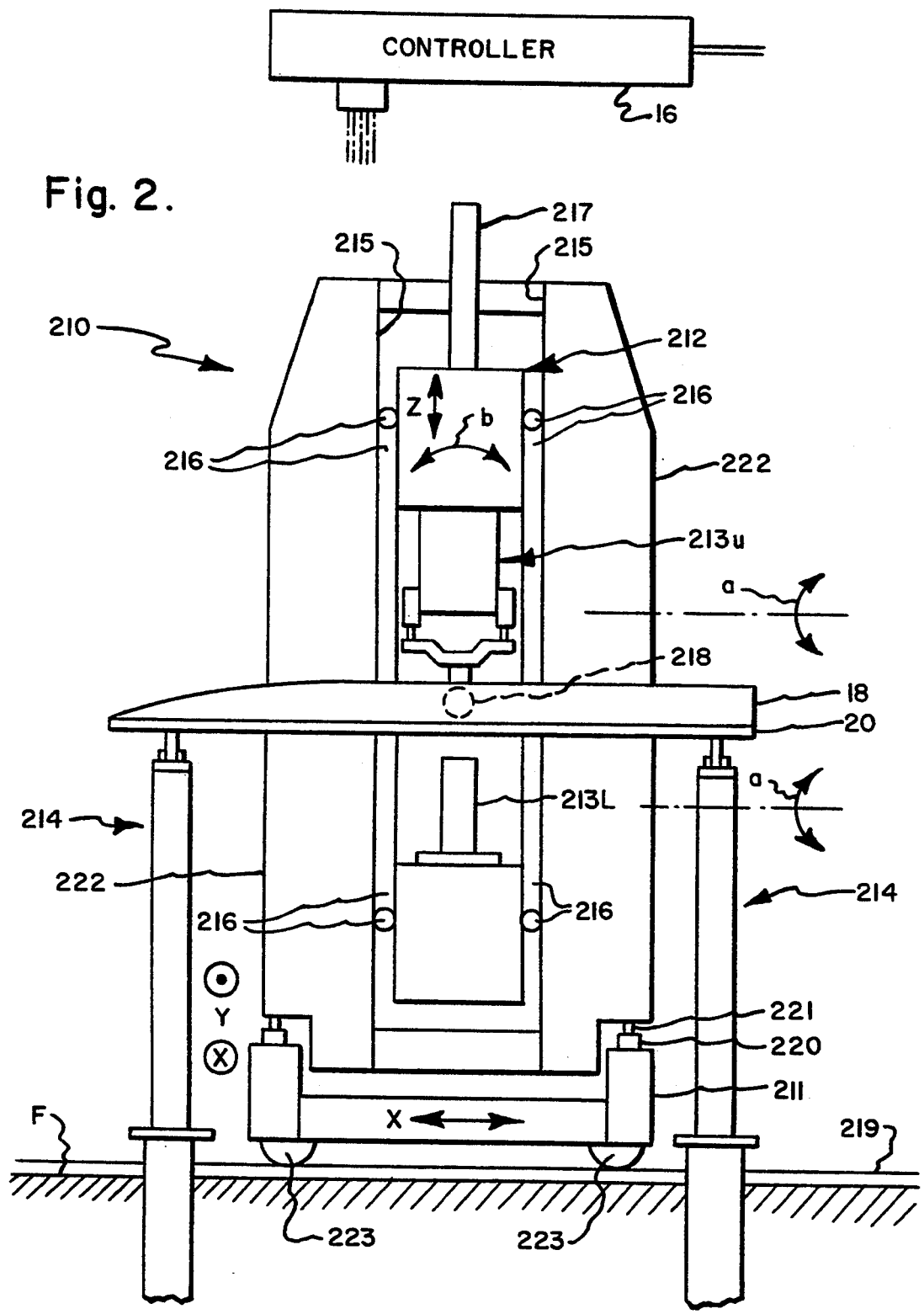

METHOD AND APPARATUS FOR POSITIONING A WORKPIECE AND TOOLING

TECHNICAL FIELD

The present invention relates generally to a method and apparatus for positioning a workpiece or tooling, and more particularly to a method and apparatus for positioning the top surface of a workpiece assembly in proper relationship with respect to tooling, or for positioning the tooling in proper relationship with respect to the top surface of a workpiece, and used initially to clamp together two or more workpieces and to then fasten the workpieces together by riveting or the like.

BACKGROUND OF THE INVENTION

When riveting many structures, such as for example aircraft wing assemblies, it is customary to clamp two or more workpieces together into a more or less rigid clamping assembly and to then proceed with the riveting operation. One riveting method and apparatus which has been utilized by the industry for a number of years is shown in U.S. Pat. No. 3,557,442. This patent discloses the utilization of slug rivets to secure two workpieces together, the more or less stationary workpieces being initially clamped together. This patent teaches that the upper rivet-forming anvil is initially extended to a full-down locked position. Thus, in order to accomplish the method and apparatus of this invention, it is necessary to either initially position the workpieces with respect to the tooling, or alternatively to properly position the tooling with respect to the workpieces. In some situations, due the very large size of the workpieces, such as for example an entire wing panel, an apparatus is provided, such as that shown in U.S. Pat. No. 3,534,896, wherein the tooling can be positioned with respect to the workpiece. It is also known that workpieces can be positioned with respect to tooling. Thus, if the tooling includes a frame which is only movable in a horizontal position, typically the fully extended lower position of the upper anvil is always in the same horizontal plane. In this case, it is therefore necessary to properly position the workpieces with respect to the tooling before the clamping operation is commenced in order to provide satisfactory results with prior art method and apparatus of this type. Thus, it can be seen that when this form of apparatus is utilized the workpiece must be properly positioned prior to the commencement of each riveting operation. While this procedure will give satisfactory results in the finished product, it is time consuming.

OBJECTS AND SUMMARY OF THE INVENTION

It is an object of the present invention to provide a method and apparatus for positioning the top surface of a workpiece in proper relationship with respect to a fully extended upper clamp bushing, or for positioning the fully extended upper clamp bushing in proper relationship with respect to the top surface of a workpiece, which establishes a desired workplane wherein the top surface of the workpiece is always disposed in a normal position with respect to the lowermost surface of the upper clamp bushing and just in contact with the lowermost surface even though the top surface was disposed either below or above the desired workplane at the commencement of the clamping operation.

More particularly, it is an object of the present invention to provide a method and apparatus which is capable of moving the top surface of a workpiece or the tooling into a desired workplane and to also provide a method and apparatus for determining whether or not the top surface of the workpiece adjacent the area which is to be fastened lies within the desired workplane, the apparatus including a plurality of position sensors associated with the upper clamp bushing, which sensors are capable of sensing when the upper clamp bushing contacts the top surface of the workpiece or is contacted by it, the apparatus further including control means for moving the workpiece to the desired position in response to the position sensors.

The above objects and other objects and advantages of this invention will become more apparent after a consideration of the following detailed description taken in conjunction with the accompanying drawings in which a preferred form of this invention is illustrated.

BRIEF DESCRIPTION OF THE DRAWINGS

FIG. 2 is an overall view of an apparatus incorporating the principles of the present invention with a stationary workpiece.

DETAILED DESCRIPTION

Figure 1:
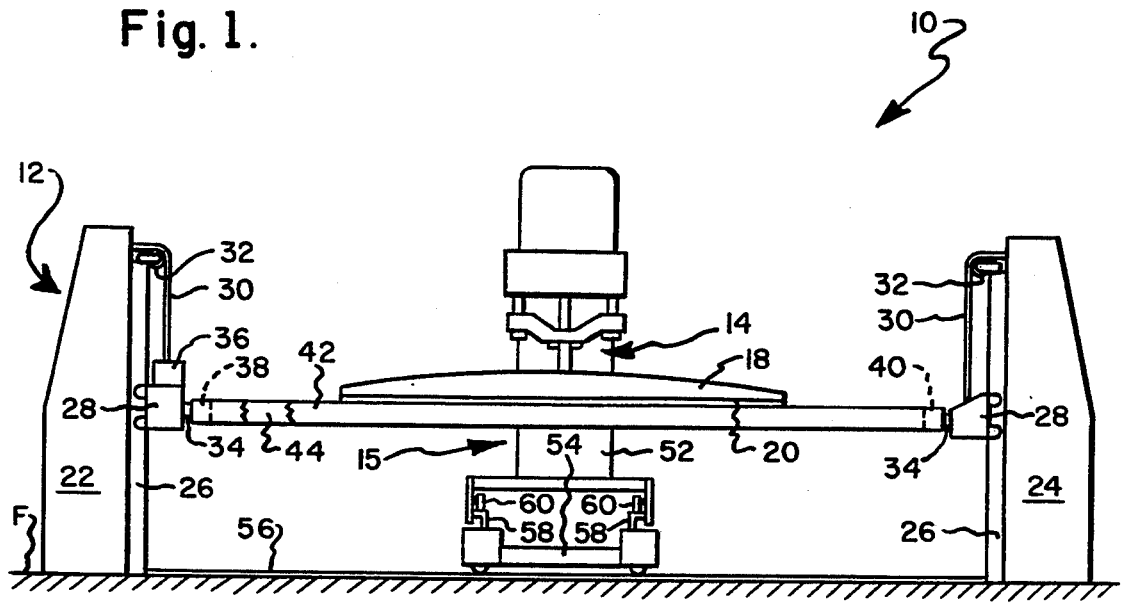
FIG. 1 is an overall view of an apparatus incorporating the principles of the present invention with a moving workpiece.

Referring first to FIG. 1, there is shown an embodiment according to the present invention for use with a moving workpiece wherein the apparatus for positioning is indicated generally at 10. The apparatus consists of workpiece holding means indicated generally at 12, tooling indicated generally at 14, means including a movable frame, indicated generally at 15 for moving the tooling, and a controller 16 for sensing the position of the tooling with respect to the top surface of the top workpiece and to cause corresponding movement of either the tooling or of the workpiece. In addition, various sensing means are provided for sensing the relative position of various components of the tooling.

The workpiece holding means is capable of holding two or more workpieces, indicated by top panel 18 and bottom panel 20 in FIG. 1. The workpiece holding means includes two spaced apart vertically extending piers 22, 24 which are rigidly secured to a supporting surface such as a floor F. As the piers 22 and 24 are substantially mirror images of each other, the same reference numerals will be applied to components of each of the piers. Thus, each of the piers 22 and 24 include a vertically extending track 26 upon which is mounted a wheeled carriage 28 which may be moved in a vertical direction by any suitable mechanism, which the drawings is illustrated by a roller chain 30 which passes over a sprocket 32, chain 30 being caused to be moved in a vertical direction under the influence of a motor (not shown) the operation of which motor is in turn controlled by the controller 16. A shaft 34 is journalled in a suitable spherical bearing (not shown) carried by an associated wheeled carriage 28, and one of the shafts is capable of being rotatably positioned by a mechanism 36, which mechanism is controlled by controller 16. A support framework is secured to the opposed shafts 34, the support framework including left and right transversely extending box frame members 38, 40, and front and rear box beams 42, 44. Supported within the open framework defined by the various beams 38 through 44 is the workpiece assembly which, as shown FIG. 1, may consist of a section of wing panel.

At this point it should be noted that the workpiece holding means is capable of moving the ends of a workpiece assembly independently up and down and is further capable of rotating the workpiece assembly about a line which extends between the ends of the workpiece assembly. In this manner the workpiece can be properly positioned so that the top surface of the top workpiece at the location to be fastened together may be properly positioned so that it lies in the operational workplane of the tooling.

Referring now to FIG. 2, there is shown an embodiment for use with a fixed workpiece wherein the apparatus for positioning the tooling is indicated generally at 210. The apparatus consists of first and second main carriages generally indicated at 211 and 222, respectively, to transport the tooling in a horizontal plane and in substantially orthogonal directions designated X and Y. Carriage 211 moves along a track 219 on a floor or supporting surface in the X direction by means of wheels 223. Carriage 222 moves in the Y direction on carrige 211 by means of wheels 221 supported by tracks 220, the drives for both carriages being any suitable arrangements, such as rack and pinion drives. There is also provided an inner frame indicated generally 212 for vertically transporting the tooling in the Z direction together with means providing pivoting motions for normalizing about the X-Z and Y-Z planes. The upper and lower tooling is indicated generally at 213U and 213L, respectively, and a controller 16 senses the position of the tooling with respect to the top surface of the top workpiece and causes corresponding movement of the tooling. In addition, various sensing means are provided for sensing the relative position of various components of the tooling.

The carriage 222 of the positioning apparatus comprises two towers that include a vertically extending track 215 upon which is mounted a wheeled carriage 216 which may be moved in a vertical direction by any suitable mechanism, which in the drawings is illustrated by a screw mechanism 217 being caused to be moved in a vertical direction under the influence of a motor (not shown), the operation of which motor is in turn controlled by the controller 16. Frame 212 is supported on a shaft 218 in carriage 216 where it is journalled in suitable bearings (not shown) and is capable of rotation in the direction indicated b as it is driven by a suitable actuator and motor (not shown). Then upper and lower tooling heads 213U and 213L, respectively, are affixed to carriage assemblies having curved tracks (not shown) that ride on roller assemblies within frame 212. The carriage assemblies are driven by a suitable gearing arrangement (not shown) with the upper and lower tooling heads mechanically linked through a drive train and powered by one motor (not shown) to provide coordinated rotation of the tool heads about the axis indicated a. For a more detailed description of such arrangements including curved tracks for providing a and b axis movements also known in the industry as roll and pitch, respectively, reference may be made to U.S. Pat. No. 4,864,702 issued Sep. 12, 1989 entitled Five Axis Riveter and System and assigned to the assignee of the present invention, the disclosure of which is hereby incorporated by reference.

At this point it should be noted that the positioning apparatus is capable of moving the tooling assemblies in unison in any or all of five axes known in industry as X, Y, Z, a and b. These five axes are described in further detail in the above-referenced U.S. Pat. No. 4,864,702. In this manner the tooling can be moved to and normalized on the upper surface of the top workpiece 18 at any location to fasten the workpieces 18,20 together and may be properly positioned so that it lies in the operational workplane of the tooling.

The workpiece holding mechanism consists of a series of actuating supports indicated generally at 214 that are used to support the workpiece in a fixed work plane location relative to the floor F. A series of these devices is used over the length of the workpiece and may be individually retracted to provide access for fastener installation at the support locations.

Figure 3:
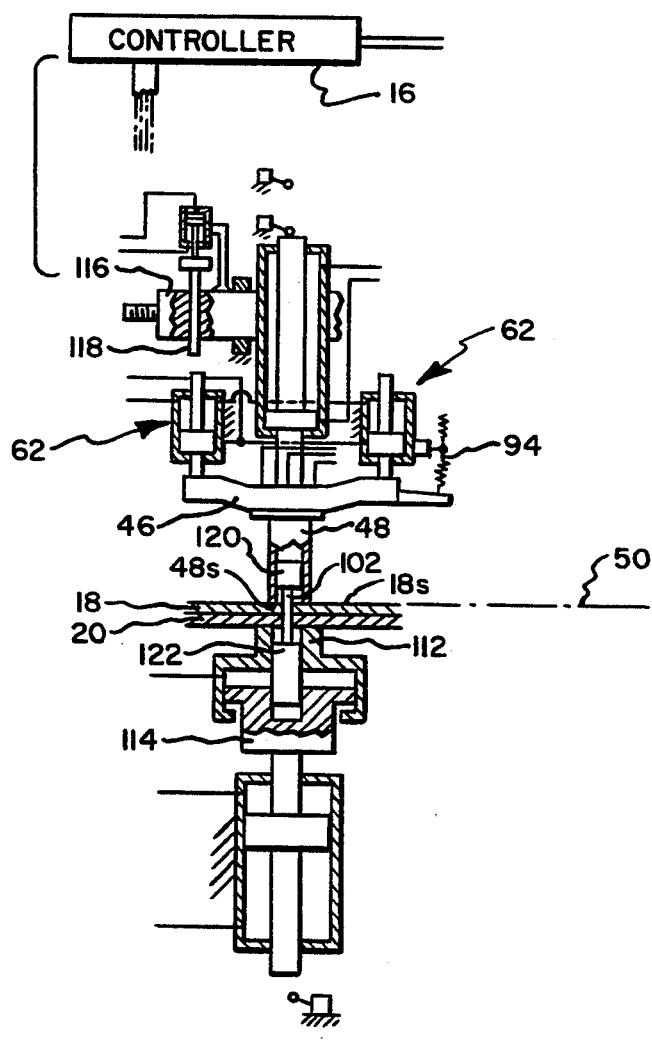
FIG. 3 is a somewhat schematic view of a portion of the apparatus shown in FIG. 1 on an enlarged scale.
Figure 4:
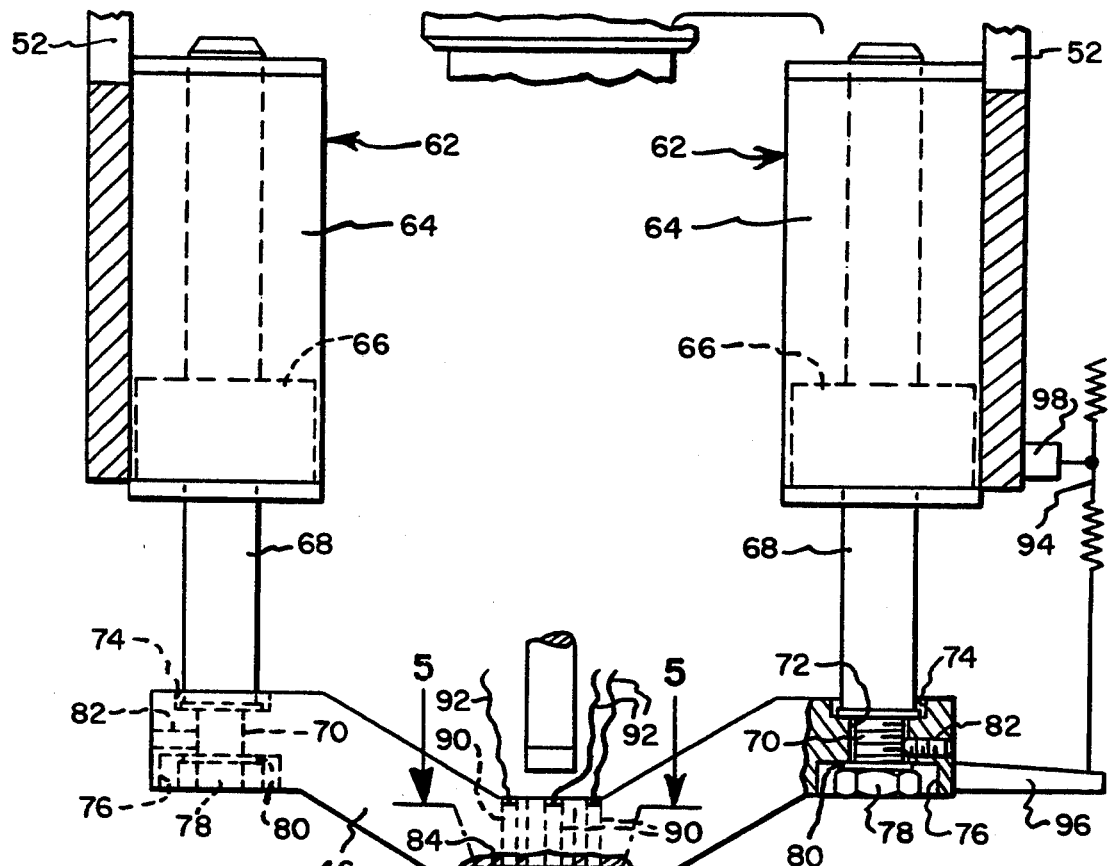
FIG. 4 is a further enlarged view of a portion of the apparatus shown in FIG. 3.

The tooling 14 of both embodiments includes an upper pressure foot plate 46 shown in FIGS. 3 and 4 and an upper clamp bushing 48 carried by the upper plate 46. The plate 46 is movable from a raised retracted position (not shown) to a fully lowered position. The upper clamp bushing has a lower planar workpiece engaging surface 48s which defines the desired workplane when in proper engagement with the upper or top surface 18s of the top panel 18, the desired workplane being indicated by the broken line 50 in FIGS. 3 and 4. The tooling 14 is mounted upon a main frame 52 (FIG. 1) or 212 (FIG. 2) which is typically of a C-shaped construction. The main frame 52 or 212 is in turn supported upon a subframe in the form of a wheeled carriage 54 (FIG. 1) or 211 (FIG. 2), the carriage 54 or 211 being supported upon a track 56 (FIG. 1) or 219 (FIG. 2) so that it can move along the longitudinal axis of the workpiece. The wheeled carriage is in turn provided with a transversely extending track 58 (FIG. 1) or 220 (FIG. 2) so that the main frame 52 or 222, which is provided with wheels 60 (FIG. 1) or 221 (FIG. 2) may move transversely with respect to the workpiece assembly 18, 20. It can thus be seen that the main frame 52 or 222 can be moved in a horizontal plane generally parallel to the workpieces 18, 20 so that the tooling 14 may be placed in a position in alignment with any point on the surface of the workpiece. The wheeled carriage 54 or 211 can be moved in any conventional manner along its track, and similarly the main frame 52 or 222 can also be moved in any conventional manner upon the carriage 54. One such conventional manner may be a rack-and-pinion mechanism, wherein the rack extends parallel to the track 56,58 or 219 and the pinion is carried by the relatively movable structure, the pinion in turn being driven by a stepping motor or the like which is under the control of the controller 16.

As shown in FIGS. 3 and 4 the upper pressure foot plate 46 is carried by two or more spaced apart cylinder assemblies, each of which is indicated generally at 62. Each cylinder assembly includes a cylinder 64 which is rigidly secured to a portion of the main frame 52 in any conventional manner. Mounted within each cylinder 64 is a piston 66 to which is secured a piston rod 68. While only two cylinder assemblies 62 are illustrated, it is also conventional to use three or four cylinder assemblies to support the upper pressure foot plate 46.

Figures 5, 6:
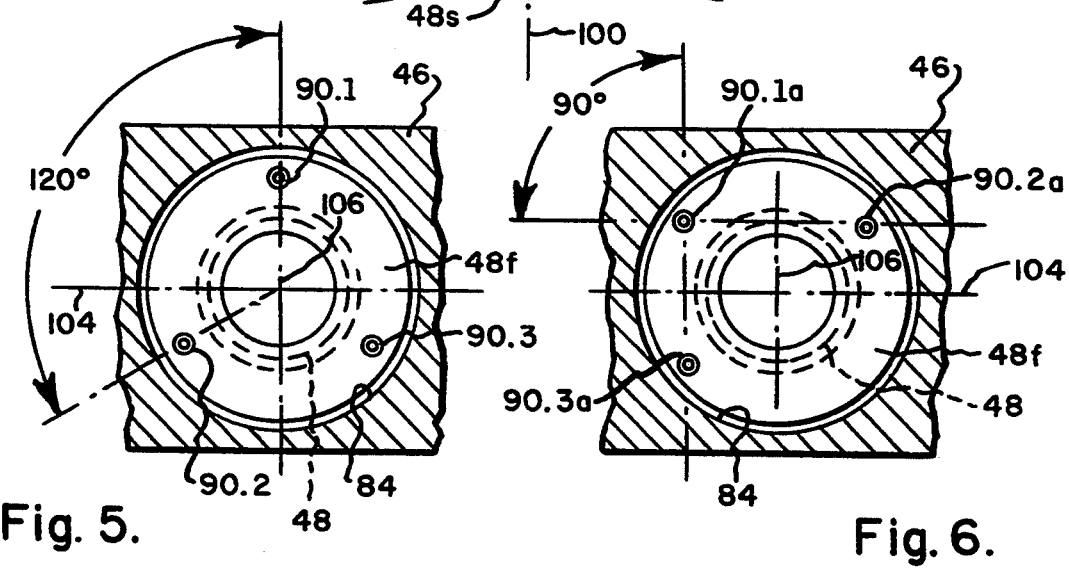
FIG. 5 is a section taken generally along the line 5—5 in FIG. 4 illustrating the manner in which position sensors may be located with respect to the upper clamp bushing.
FIG. 6 is a view similar to FIG. 5 but showing a different positioning of position sensors.

As can best be seen from FIG. 4, each piston rod 68 is provided with a reduced diameter threaded extension 70 which passes through a suitable aperture 72 in an end of the upper pressure foot plate 46. A recess 74 is formed above the aperture 72 and the shoulder between the piston rod 68 and the threaded extension 70 bears upon the annular surface or shoulder between the aperture 72 and recess 74. The threaded extension passes entirely through the aperture 72, the end of it being received within another recess 76 below the aperture 72, a nut 78 and washer 80 being utilized to secure the end of the rod 68 to an end of the upper pressure foot plate 46. A setscrew 82 is also utilized to engage the threaded extension 70. The upper pressure foot plate 46 has a midportion which extends downwardly, the midportion being provided on its bottom surface with a circular recess 84. The upper outwardly flared end 48$f$ of the upper clamp bushing 48 as viewed in FIG. 4 is received within the circular recess 84 and it is loosely held therein by an annular supporting ring 86 which is secured to the lowermost surface of the upper pressure foot plate by fasteners 88. It can be seen from FIG. 4 that if an upward force is directed to an outer edge of the lower surface 48$s$ of bushing 48 that the upper clamp bushing can tilt from the workplane 50 to other planes indicated by the broken lines 50.1, 50.2 to either side of the desired workplane 50. In addition, the upper clamp bushing 48 is also permitted to move upwardly a slight distance within the circular recess 84 until it contacts sensors 90. Thus, three identical sensors 90 are mounted within the upper pressure foot plate a slight distance above the top surface of the flange 48$f$, which sensors may be contacted by the flange when the bushing 48 is in proper engagement with the upper surface of the top workpiece. As can be seen from FIGS. 5 and 6, the sensors may be either 120° apart, as shown in FIG. 5, or 90° apart, as shown in FIG. 6. The sensors 90 may be mounted in the upper pressure foot plate 46 in any conventional manner not material to the present invention and a lead 92 extends from each of the sensors 90 to the controller 16. The sensors may be any form of device which will transmit a signal when contacted, and a preferred form of sensor is a proximity switch.

The cylinder assemblies 62 can move the upper pressure foot plate from its fully retracted position (not shown) when the pistons 66 are in their uppermost position to a fully lowered position when the pistons 66 have been moved to a lowered position. The fully lowered position can be sensed by an encoder 94 which extends between a member 96 carried by the upper pressure foot plate 46 and a bracket 98 carried by the frame 52 or 222 or the cylinder 64 which is rigidly connected to the frame.

In operation, the main frame 52 or 222 will be moved to the desired working position wherein the centerline 100 of the upper clamp bushing is in line with the location on the workpiece 20 where a fastener, such as a slug rivet indicated at 102 in FIG. 3, is to be inserted. This is accomplished by moving the wheeled carriage 54 or 211 under the control of the controller in an X-direction to a desired X-location and also by moving the main frame 52 or 222 on the wheeled carriage to a suitable Y-location, this also being controlled by the controller 16. During this movement to the desired X-Y location the upper clamp bushing is in its fully retracted position. When this desired position has been attained, the lowermost surface 48$s$ will be disposed above the top surface 18$s$ of the top workpiece.

After the initial positioning step has been completed the top surface of the workpiece assembly will now be properly positioned. This is achieved by initially causing the upper pressure foot plate 46 to be moved towards its fully lowered position. If the top surface 18$s$ is initially in the desired workplane 50, the upper pressure foot plate 46 will move downwardly until it achieves its fully lowered position, which is sensed by the encoder 94. At the same time that this position is achieved, the lower surface of the upper clamp bushing will be in flush contact with the top surface 18$s$ of the top workpiece 18, the bushing having been moved within the circular recess 84 so that the upper flange 48$f$ is in proper engagement with all three sensors 90.

The bushing 48 has sufficient clearance within the recess 84 so that if the top surface 18$s$ does not lie in the desired plane, the bushing can rock as it comes into contact with the top surface causing a signal to be sent to only one of the sensors. Thus, let us assume that a portion of the top surface 18$s$ where it intersects the X-plane (indicated by the broken line 104 in FIGS. 5 and 6) lies in the line of intersection but that the workpiece has been rotated somewhat about its ends. Then, as the upper pressure foot plate 46 is moved towards its fully lowered position, contact will be initially to one side of the line 104. In this connection let us assume with reference to FIG. 5 that the uppermost surface is initially contacted by a portion of the lower surface 48$s$ to cause the bushing to be tilted in such a manner that sensor 90.1 is initially satisfied. As the other two sensors have not been satisfied at this point in time the workpiece or the tooling may be rotated along the line which extends between the ends of the workpiece until sensors 90.2 and 90.3 are satisfied. As the encoder 94 will now be satisfied along with all three sensors 90.1, 90.2 and 90.3 no further movement of the workpiece or tooling will be caused by the controller 16 as the desired workplane will have been established.

If the workpiece or tooling again is more or less in the proper workplane except that one side is higher than the other, the workpiece or tooling having been rotated about that line 106 which intersects the top surface 18$s$ of the work surface along the Y-plane then, with reference to FIG. 6, it can be seen that if the right-hand side is higher as indicated by the tilt line 50.2, then sensor 90.2$a$ will be initially satisfied. The controller in response to signals received through the lead associated with 90.2$a$ may cause the right-hand end to be lowered and simultaneously may cause the left-hand end of the workpiece to be raised (FIG. 1) or cause frame 212 to be rotated (FIG. 2) until all sensors 90.1$a$, 90.2$a$, and 90.3$a$ are satisfied. Similarly, if the workpiece or tooling is rotated about the Y-axis so that the left-hand side is higher as indicated by the tilt line 50.1 then both sensors 90.1$a$ and 90.3$a$ will be simultaneously satisfied and the controller will cause the workpiece to be rotated about line 106 by moving the left-hand end downwardly while simultaneously moving the right-hand end upwardly (FIG. 1) or cause from 212 to be rotated (FIG. 2) until all sensors are fully satisfied. It should be appreciated that in each of the conditions mentioned, where a centerline on the top surface 18$s$ lies in the workplane but the surface 18$s$ is either tilted or rocked about the centerline that initially the upper pressure foot will not attain its fully lowered position when contact is initially sensed and that it will continue to move downwardly during the rotational movement of the workpiece or frame 212 about either line 104 or 106 until it has achieved its fully lowered position at which time all sensors 90 and 94 are satisfied.

Let us assume now that the workpiece is spaced below the desired workplane. If this is the case, the upper pressure foot plate 46 will be moved to its lowermost position which will then be sensed by sensor or encoder 94. As the there is no contact with any of the sensors 90, the workpiece will be moved upwardly (FIG. 1) or the frame 212 downwardly (FIG. 2) until there is contact. If the upper surface is not initially flush with the lower surface 48s, the workpiece or tooling will then be suitably rocked until it is flush. Thus, with reference to FIG. 5 let us assume that sensor 90.3 is initially contacted. The left-hand end of the workpiece will then be caused to be raised while the right-hand end is lowered slightly (FIG. 1) or the frame 212 is caused to be rotated (FIG. 2) so that the sensor 90.3 is maintained in proper contact. If after this rocking or rotational movement of the workpiece or tooling has taken place and only sensors 90.2 and 90.3 are satisfied, then there will be a further rotational movement until all of the sensors are satisfied.

Finally, let us assume that as the upper pressure foot plate starts its downward movement that it contacts a too high workpiece. Then, the workpiece will be moved downwardly (FIG. 1) or the frame 212 moved upwardly (FIG. 2) while simultaneously the upper pressure foot plate is also moved downwardly.

Once the upper pressure foot bushing 48 has achieved its lowermost position and the top surface of the top workpiece 18 or the tooling lies in the desired workplane 50, it is only necessary to then clamp the workpiece and commence the various operations which are to take place. While various procedures may be utilized, in a typical example, the lower clamp bushing 112 which may be mounted upon a lower clamp piston 114 as shown in FIG. 3 is caused to be moved upwardly to a clamping position. The lower clamp bushing and lower clamp piston are of the type illustrated generally in U.S. Pat. No. 4,864,713, the subject matter of which is incorporated herein by reference thereto. In addition, a subframe 116 may be indexed to a suitable position to place a drill spindle 118 in alignment with the desired location where the fastener is to be inserted. The subframe 116 will be indexed to another position after drilling so that a fastener 102 may be inserted into the drilled hole. If the fastener is a slug rivet, as illustrated, it is then only necessary to engage the ends of the slug rivet with upper and lower upsetting anvils 120, 122 and to upset the rivet in a manner which is more fully disclosed in the aforementioned patent. As the manner of inserting the fastener is not part of the present invention, it will not be described further.

In summary, it can be seen that by providing an upper clamp bushing 48 which can move slightly when it comes into initial contact with the top surface of a workpiece, and which is associated with various sensors, which sensors in turn provide position feedback information to a controller, and that also by providing an apparatus which senses when the upper bushing is in its desired fully lowered position, which sensed position is also fed back to the controller, that it is possible to accurately position the top of surface of a workpiece or the tooling through suitable servo-mechanisms so that during the automatic riveting or fastening of a large surface which requires tooling to be moved from position to position that it can be done accurately and expediently with minimal human intervention.

While a preferred structure in which the principles of present invention have been incorporated is shown and described above, it is to be understood that widely differing means may be employed in the practice of the broader aspects of this invention. Accordingly, this invention is intended to embrace all such alternatives, modifications, and variations which fall within the spirit and scope of the appended claims.

What is claimed is:

1. A method of providing a proper positional relationship between a workpiece assembly and tooling carried by a movable frame, said workpiece assembly having a top surface and said assembly comprising two or more workpieces one of which is atop workpiece having an upper surface, which tooling is used to initially clamp together the two or more workpieces and to then fasten the workpieces together, the tooling including an upper clamp bushing having a lower surface and carried by an upper pressure foot plate, the lower surface of the upper clamp bushing establishing a desired workplane when the upper pressure foot plate is fully lowered and the upper bushing is in proper engagement with the upper surface of the top workpiece; the method comprising the following steps:

providing a workpiece holding apparatus;

providing a movable frame and tooling mounted on the frame, the tooling being movable in a horizontal plane and including an upper pressure foot plate movable from a raised retracted position to fully lowered position, and an upper clamp bushing carried by the upper pressure foot plate for limited vertical shifting movement with respect to the upper pressure foot plate, the upper clamp bushing having a lower planar workpiece engaging surface;

moving the tooling in a horizontal plane with the upper pressure foot plate in its raised retracted position to an operational position where the upper clamp bushing is substantially in line with a location where a fastener is to be inserted;

moving the upper pressure foot plate downwardly towards its fully lowered position; and a) either sensing when the upper pressure foot plate has attained its fully lowered position, and then, causing relative movement between the workpiece assembly and the tooling in such a manner that the top surface of the workpiece is in flush clamping contact with the lower surface of the upper clamp bushing if the top surface of the workpiece assembly is not in flush clamping contact with the lower surface of the upper clamp bushing; or b) sensing when the lower surface of the upper clamp bushing is in force applying contact with the top surface of the workpiece assembly, and then causing relative movement between the workpiece assembly and the tooling in such a manner that the top surface of the workpiece is in flush contact with the lower surface of the upper clamp bushing and then causing relative movement between the upper pressure foot plate and the workpiece assembly until the upper pressure foot plate has achieved its fully lowered position.

2. The method of claim 1, wherein the workpiece holding apparatus is capable of moving the workpiece assembly up and down and wherein said steps of causing relative movement between the workpiece assembly and the tooling in such manner that the top surface of the workpiece is in flush clamping contact with the lower surface of the upper clamp bushing comprise moving the workpiece upwardly when the pressure foot plate has attained its fully lowered position.

3. The method of claim 1, wherein the workpiece holding apparatus is capable of moving the workpiece assembly up and down and wherein said step of causing relative movement between the upper pressure foot plate and the workpiece assembly comprises moving the workpiece downwardly unitl the pressure foot plate has achieved its fully lowered position.

4. The method of claim 1, further including sensing whether or not the top surface of the workpiece assembly is in flush clamping contact with the lower surface of the upper clamp bushing.

5. The method of claim 1, wherein the workpiece holding apparatus is capable of moving the ends of the workpiece assembly independently up and down and is further capable of rotating the workpiece assembly about a line which extends between the ends of the workpiece assembly, and wherein said steps of causing relative movement between the workpiece assembly and the tooling in such a manner that the top surface of the workpiece assembly is in flush clamping contact with the lower surface of the upper clamp brushing comprise moving the ends of the workpiece assembly independently up and down or rotating the workpiece assembly about the line which extends between the ends of the workpiece assembly.

6. The method of claim 5, further including sensing whether or not the top surface of the workpiece assembly is in flush clamping contact with the lower surface of the upper clamp bushing.

7. The method of claim 1, wherein the frame includes means for moving the tooling toward and away from the workpiece and wherein said steps of causing relative movement between the workpiece assembly and the tooling in such manner that the top surface of the workpiece is in flush clamping contact with the lower surface of the upper clamp bushing comprise moving the tooling downwardly when the pressure foot plate has attained its fully lowered position.

8. The method of claim 1, wherein the frame includes means for moving the tooling toward and away from the workpiece and wherein said step of causing relative movement between the workpiece and the tooling comprises moving the tooling upwardly until the pressure foot plate has achieved its fully lowered position.

9. The method of claim 1, wherein the frame includes means for rotating the tooling about roll and pitch axes and wherein said steps of causing relative movement between the workpiece assembly and the tooling in such a manner that the top surface of the workpiece assembly is in flush clamping contact with the lower surface of the upper clamp bushing comprise moving the tooling about the roll or the pitch axes.

10. The method of claim 9, further including sensing whether or not the top surface of the workpiece assembly is in flush clamping contact with the lower surface of the upper clamp bushing.

11. Apparatus for providing a proper positional relationship between a workpiece assembly and tooling carried by a movable frame, said workpiece assembly having a top surface and said assembly comprising two or more workpieces one of which is a top workpiece having an upper surface, which tooling is used to initially clamp together the two or more workpieces and to then fasten the workpieces together, the tooling including an upper clamp bushing having a lower surface and carried by an upper pressure foot plate, the lower surface of the upper clamp bushing establishing a desired workplane when the upper pressure foot is fully lowered and the upper bushing is in proper engagement with the upper surface of the top workpiece; the apparatus comprising the following:

workpiece holding means;

a movable frame;

tooling mounted on the frame, the tooling being movable in a horizontal plane, the tooling including an upper pressure plate movable from a raised retracted position to a fully lowered position, and an upper clamp bushing carried by the upper pressure foot plate for limited vertical shifting movement, the upper clamp bushing have a lower planar workpiece engaging surface;

means for moving the tooling in a horizontal plane with the upper pressure foot plate in its raised retracted position to the next operational position where the upper clamp bushing is substantially in line with location where a fastener is to be inserted;

means for moving the upper pressure foot place downwardly towards its fully lowered position;

first sensing means for sensing when the upper pressure foot plate has attained it fully lowered position;

second sensing means for sensing when the lower surface of the upper clamp bushing is in force applying contact with the top surface of the workpiece assembly; and means for either causing relative movement between the workpiece assembly and the tooling in such manner that the top surface of the workpiece is in flush contact with the lower surface of the upper clamp bushing if the first sensing means initially senses attainment of the fully lowered position of the upper pressure foot plate or causing relative movement between the workpiece assembly and the upper pressure foot plate until the upper pressure foot plate achieves its fully lowered position if the second sensing means initially senses attainment of force applying contact by the upper clamp bushing.

12. Apparatus according to claim 11, wherein the workpiece holding means includes means for moving the workpiece assembly up and down and wherein the means for causing relative movement between the workpiece assembly and the tooling moves the workpiece assembly upwardly when the first sensing means initially senses attainment of the fully lowered portion of the upper pressure foot plate.

13. Apparatus according to claim 11, wherein the workpiece holding means includes means for moving the workpiece assembly up and down and wherein the means for causing relative movement between the upper pressure foot plate and the workpiece assembly moves the workpiece downwardly until the upper pressure foot plate achieves its fully lowered position.

14. Apparatus according to claim 13, wherein the means for causing relative movement between the workpiece assembly and the upper pressure foot plate comprises means for causing the workpiece holding means and the means for moving the upper pressure downwardly to move both the upper pressure foot plate and the workpiece assembly downwardly.

15. Apparatus according to claim 11, wherein the frame includes means for moving the tooling toward and away from the workpiece assembly and wherein the means for causing relative movement between the workpiece assembly and the tooling comprises means for moving the tooling downwardly when the first sensing means initially senses attainment of the fully lowered position of the upper pressure foot plate.

16. Apparatus according to claim 11, wherein the frame includes means for moving the tooling toward and away from the workpiece assembly and wherein the means for causing relative movement between the workpiece and the upper pressure foot plate includes means for moving the tooling and with it the upper pressure foot plate upwardly until the pressure foot achieves its fully lowered position.

17. Apparatus according to claim 11, wherein the second sensing means includes means for sensing whether or not the top surface of the workpiece assembly is in flush clamping contact with the lower surface of the upper clamp bushing.

18. Apparatus according to claim 17, wherein the workpiece holding means includes means for moving the ends of the workpiece assembly independently up and down and means for rotating the workpiece assembly about a line which extends between the ends of the workpiece assembly and wherein the means for causing relative movement between the workpiece assembly and the tooling causes the top surface of the workpiece assembly to be in flush clamping contact with the lower surface of the upper clamp bushing by moving the ends of the workpiece assembly independently up or down or by rotating the workpiece assembly about the line which extends between the ends of the workpiece assembly.

19. Apparatus according to claim 17, wherein the frame includes means for rotating the tooling about roll and pitch axes and wherein the means for causing relative movement between the workpiece assembly and the tooling causes the top surface of the workpiece assembly to be in flush clamping contact with the lower surface of the upper clamp bushing by moving the tooling about the roll or the pitch axes.

20. Apparatus according to claim 11 wherein the first sensing means includes a position encoder extending between the upper pressure foot plate and the frame.

21. Apparatus according to 11 wherein the second sensing means includes a plurality of individual sensors extending between the upper clamp bushing and the upper pressure foot plate.

22. A method for positioning a workpiece having a top surface in proper relationship with respect to tooling including a fully extended upper clamp bushing having a lowermost surface, or for positioning the fully extended upper clamp bushing in proper relationship with respect to the workpiece, which establishes a desired workplane wherein the top surface of the workpiece is always disposed in a normal position with respect to the lowermost surface of the upper clamp bushing and just in contact with the lowermost surface even though the top surface of the workpiece was disposed either below or above the desired workplane at the commencement of the clamping operation, said method comprising moving the top surface of the workpiece or the tooling into a desired workplane; determining whether or not the top surface of the workpiece adjacent an area which is to be fastened lies within the desired workplane by utilizing a plurality of position sensors associated with the upper clamp bushing which sensors are capable of sensing when the upper clamp bushing contacts the top surface of the workpiece or is contacted by it; and moving the workpiece in a controlled manner to the desired position in response to the determination provided by the position sensors.

23. Apparatus for positioning a workpiece having a top surface in proper relationship with respect to tooling including a fully extended upper clamp bushing having a lowermost surface, or for positioning the fully extended upper clamp bushing in proper relationship with respect to the workpiece, which establishes a desired workplane wherein the top surface of the workpiece is always disposed in a normal position with respect to the lowermost surface of the upper clamp bushing and just in contact with the lowermost surface even though the top surface of the workpiece was disposed either below or above the desired workplane at the commencement of the clamping operation, said apparatus comprising means for moving the top surface of a workpiece or the tooling into a desired workplane;

means for determining whether or not the top surface of the workpiece adjacent an area which is to be fastened lies within the desired workplace including a plurality of position sensors associated with the upper clamp bushing, which sensors are capable of sensing when the upper clamp bushing contacts the top surface of the workpiece or is contacted by it; and means for moving the workpiece in a controlled manner to the desired position in response to the determination provided by the position sensors.

* * * * *